Jan. 6, 1942.　　　　J. W. WHITE　　　　2,269,297
AXIALLY CENTERED RECOIL MECHANISM FOR MACHINE GUNS

Filed Jan. 22, 1940　　　2 Sheets-Sheet 1

INVENTOR.
John W. White.
BY
ATTORNEY.

Jan. 6, 1942.  J. W. WHITE  2,269,297
AXIALLY CENTERED RECOIL MECHANISM FOR MACHINE GUNS
Filed Jan. 22, 1940  2 Sheets-Sheet 2
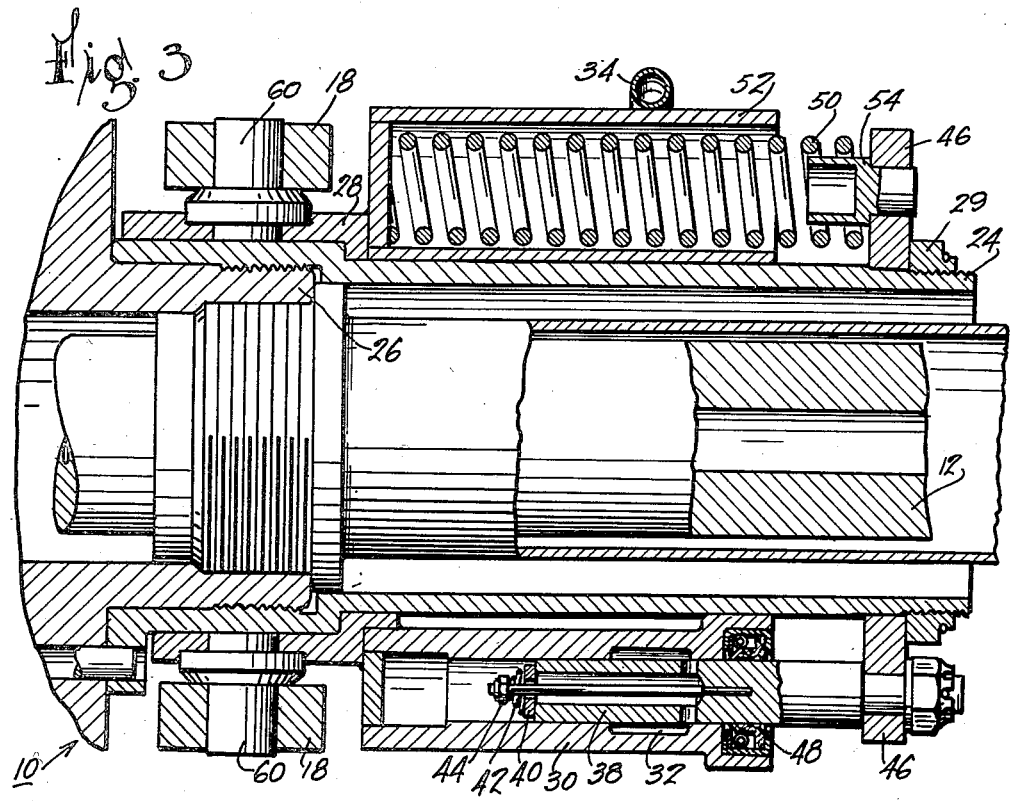
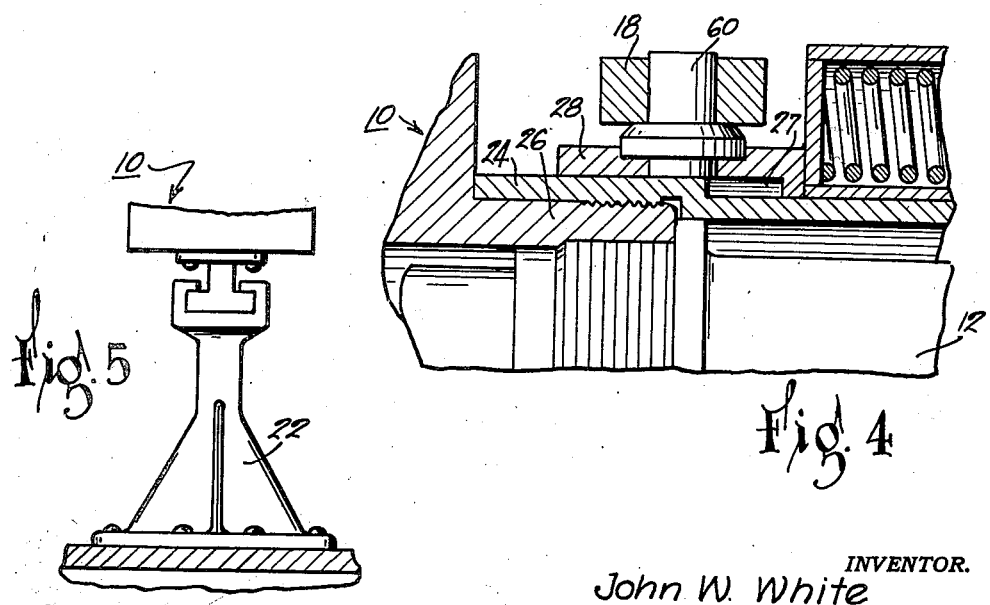
INVENTOR.
John W. White
BY
ATTORNEY.

Patented Jan. 6, 1942

2,269,297

UNITED STATES PATENT OFFICE 2,269,297

AXIALLY CENTERED RECOIL MECHANISM FOR MACHINE GUNS

John W. White, Burbank, Calif., assignor to Bendix Aviation Corporation, South Bend, Ind., a corporation of Delaware Application January 22, 1940, Serial No. 314,902

3 Claims. (Cl. 89—42)

This invention relates to recoil mechanisms, and more particularly to recoil mechanisms for machine guns in airplane use.

One important governing consideration for any device used in aircraft is weight. The object must be as light as possible. Another consideration arising from use with armament is that the device must be reliable. To this end the working parts must be few and simple and designed to minimize service trouble. A further consideration in aircraft use is that a gun recoil mechanism must be so placed with relation to the recoil forces that couples and forces transmitted to the airplane will not affect the operation and navigation of the aircraft.

It is therefore an object of this invention to provide a light weight recoil mechanism for use on aircraft machine guns.

Another object is to provide a recoil mechanism that is free from natural periods of vibration, is reliable in operation, and requires little or no maintenance.

Still another object is to provide a recoil mechanism for aircraft machine guns that is so placed on the gun that the moments translated to the aircraft are negligible.

Other objects and advantages of the invention appear in the following description and claims, which may best be understood when taken in conjunction with the accompanying figures, in which:

Figure 3 is a longitudinal section of the mechanism along the line 3—3 of Figure 2;

Figure 4 is a fragmentary view in section, similar to Figure 3 showing the parts as associated during recoil; and Figure 5 is a detail of the rear guide.

Figure 1:
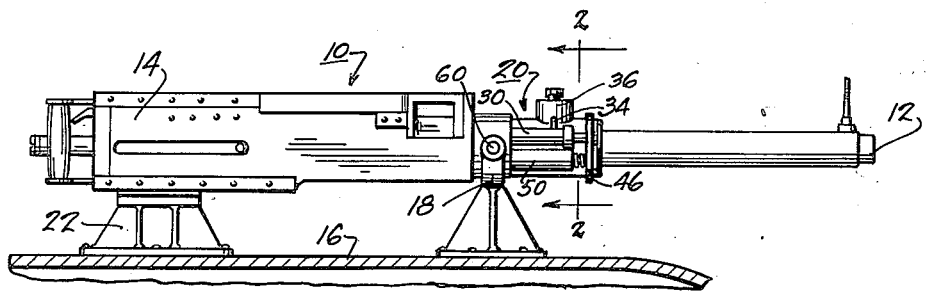
Figure 1 is an elevation of a machine gun provided with the invention.

A machine gun mounting embodying one form of my invention is shown in Figure 1, wherein a machine gun 10, comprising a barrel member 12 and a body member 14, is mounted on a wing member 16 by a rear guide 22 and a yoke 18 holding a recoil unit 20. The machine gun may be of any desired type or caliber.

The recoil unit 10 is of the hydrospring type. The spring type alone is objectionable because the recoil of intermittent firing of a machine gun may coincide with the natural period of a spring or a group of springs and thus bring about excessive reciprocating forces. To prevent this, hydraulic energy-absorbing means is employed in conjunction with the springs.

The embodiment of the invention shown is so designed that the construction is extremely light. This result is achieved by fabricating the various cylinders and sleeves by forming and securing together parts made of stampings and sections of tubing, rather than boring them out of solid forgings and castings. Further, all members are as light and thin as possible in view of the service requirements. The lightness of the assembly of the various parts is due in part also to the use of hydrogen welding whereby no weld beads are left on the material.

Figure 2:
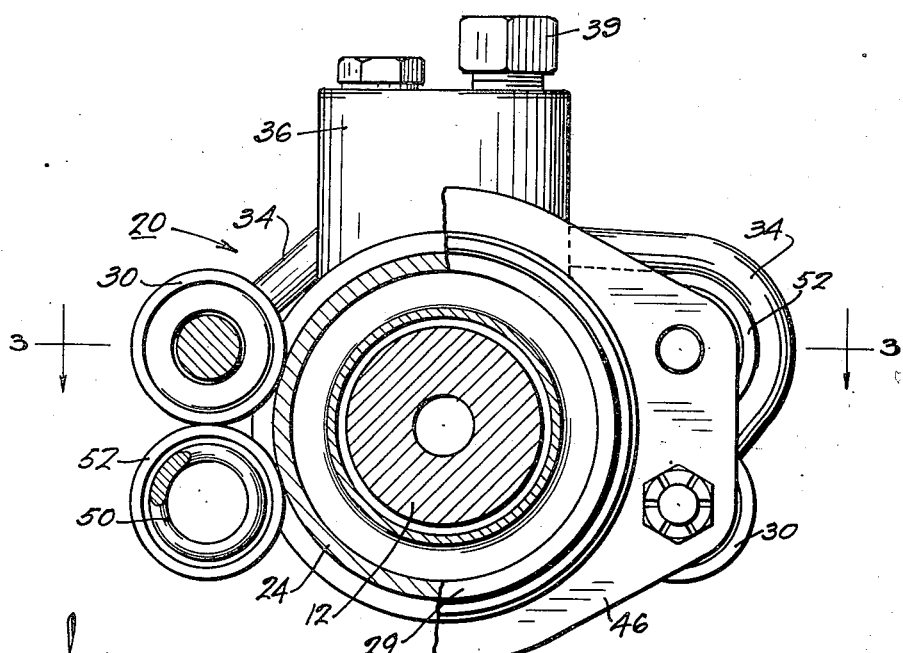
Figure 2 is a view of the recoil mechanism shown partially in section, taken substantially on the line 2—2 of Figure 1.

The particular recoil unit 10 shown in detail in Figures 2 and 3 and 4 is formed by attaching a cylindrical sleeve 24 to the nose piece 26 of the gun 10. This sleeve contains an offset cylindrical portion adjacent the gun body. A close fitting recoil sleeve 28 adapted to slide on nose sleeve 24 is placed over the nose sleeve 24 and is held to a limited longitudinal reciprocation thereon by an annular nut 29 screwed on the nose sleeve 24.

Attached to the recoil sleeve by hydrogen welding are two hydraulic plunger units and two spring units. Each unit of a pair of diametrically opposite the other, so that all reactive forces will be balanced symmetrically about the axis of the gun barrel. Each type of unit takes a substantial part of the reaction forces of the projectile, the energy being turned into heat in the hydraulic unit and stored as energy in the spring unit. In addition to acting as a recoil mechanism, the spring is a counter-recoil mechanism, is preloaded, and is strong enough to quickly return the machine gun to its firing position after recoil. Also it supports the weight of the machine gun when the airplane is in a vertical position, or accelerating in a vertical position.

Each hydraulic unit includes a cylinder 30 closed at one end and hydrogen welded to the recoil sleeve 28. The outer end of the cylinder is internally and circumferentially recessed at 32 and communicates with a reservoir 36 through a tube 34. The reservoir is filled through a tube cap 39, which prevents filling of the reservoir completely and leaves an air space above the hydraulic fluid. A piston 38 traverses the cylinder 30, and is bored to provide an axial passage intersecting a cross passage by means of which it communicates with the recess 32. A variable opening plate 40 is placed on the end of the piston and held in place by a spring 42 and bolt 44. The piston is attached fixedly at its end to a recoil ring 46, which is held fixed on the nose sleeve 24 by the nut 29. A packing gland 48 seals the piston from low pressure leakage.

Each of the spring units comprises a compression preloaded spring 50 held in a light cylinder 52 which is hydrogen welded to the recoil sleeve 28. The free end of the spring contacts a knob 54 on the recoil ring 46, which centers the spring in its retainer.

The counter-recoil brake or buffer mechanism of the system is of the pneumatic type formed by the offset portions of the nose and recoil sleeves upon recoil. When the gun fires, the recoil sleeve is held by the yoke 18, and the nose sleeve withdrawn from it. This withdrawal creates a cavity 27 at the offset as shown in Figure 4, and it fills with air coming in through the clearance space between the sleeves. This is an additional recoil mechanism operating on suction. Upon return to the firing position of Figure 3, the air in the cavity is compressed and acts as a pneumatic cushion to ease the return of the gun.

The yoke 18 holds the recoil mechanism through trunnions 60, which are so placed on the recoil sleeve 26 with relation to the various elements of the gun that the forces transmitted to the aircraft are at a minimum. In a machine gun provided with a recoil mechanism, the forces reacting to and balancing the acceleration of the projectile are provided by the recoil mechanism, the acceleration of the gun in recoil, the acceleration of the breech bolt in the gun body, and the recoil of the gun barrel. If all these forces acted on the axis of the projectile, the gun would be in perfect equilibrium. However, the center of gravity of the gun and the center of gravity of the breech bolt, and the center of resistance of the recoil mechanism are not on the axis of the projectile in the usual gun, and these forces acting through their moment arms transmit couples to the airplane carrying the gun. In modern fighting, planes carry six or eight guns in the wings and these forces are so substantial that in conventional mountings they tend to twist the airplane off its course.

These forces transmitted to the airplane can be largely offset and minimized by placing the trunnions of the recoil mechanism off of the axis of the projectile, so that opposing and nearly equal couples will be developed that negative the reactionary couples of the guns. Thus the trunnions of the recoil mechanism must be placed on a line closely adjacent but above or below the axis of the projectile a determinable amount, the direction and amount of displacement depending upon the construction of the gun.

The machine gun is kept from turning in the recoil unit by a key fastened to one sleeve and sliding in the groove of the other sleeve. To obtain the same result, other devices may be used, such as splining the sleeves.

The body member of the gun is supported by a guide 22 shown in Figure 5 and which allows reciprocation of the gun.

The operation of the gun is as follows. The firing position is shown in Figure 3 when the spring acts through trunnions 60 to hold the gun forward. When a shot is fired, a projectile is accelerated through the gun barrel, and the accelerating forces tend to move the gun to the rear. The gun is reciprocated backward; the pistons 38 move down in the cylinders 30 forcing liquid through the pistons to recesses 32 from whence it goes up tubes 34 to the reservoir 36. Springs 50 are compressed during this action, storing energy used for returning the gun. The nose sleeve withdraws at the offset creating at 27 a partial vacuum which retards the recoil of the gun. During the same time the breech bolt and the gun barrel reciprocate in the gun body, setting up further forces opposing the reactive forces of the projectile. These forces all combine to stop the gun after a short backward travel and the gun is then returned to the firing positon by springs 50.

This return movement brings into play the pneumatic cushion formed at 27 by the offset of the sleeves 26 and 28. Due to this, the gun is eased into its firing position. Also during the return stroke the pistons 30 are pulled outwardly from the cylinders and the liquid returns from the reservoir. Plates 40 yield at this time so that there is little resistance to the return of the liquid.

The recoil mechanism has been shown as applied to a gun mounted in the structure of an airplane, but it is also applicable to a machine gun otherwise mounted for movement, manual or otherwise. In such mounts the handle gripped by the gunner is attached to the recoil mechanism or some other member outside of the gun system, so that the gunner will not be holding a reciprocating member. Also, in such mounts the rear sight may be mounted on the recoil unit, for example, on the reservoir 36. In this way the rear sight is free of vibration which eliminates fogging of the sights.

Although the invention has been illustrated and shown as attached to an aircraft machine gun, it is not limited to this use, or otherwise limited, except by the terms of the following claims.

I claim:

1. A recoil absorbing mechanism for guns comprising a stationary sleeve through which the barrel of a gun may be inserted and held coaxially for reciprocatory movement, a hydraulic cylinder secured to either outer side of said sleeve on a plane through the axis of the sleeve, spring guiding cylinders mounted on either outer side of said sleeve in a different plane through the axis of the sleeve, an apertured piston in each hydraulic cylinder, a coil spring in each spring cylinder, and a member adapted to be secured to a gun to contact said pistons and springs upon recoil of the gun.

2. A recoil absorbing mechanism for use with a gun comprising a stationary sleeve within which the barrel of a gun may be coaxially held for reciprocation, diametrically opposed hydraulic cylinders having a closed end and secured on the outer side of said sleeve, diametrically opposed spring cylinders having a closed end secured to said sleeve on an axial plane different from that of the hydraulic cylinders, springs in said spring cylinders, an apertured piston traversing each hydraulic cylinder, a piston rod connected to each piston and sealed against fluid leakage at the outer end of the hydraulic cylinders, a member adapted to be secured to a gun to contact said piston rods and said springs upon recoil of the gun, a hydraulic reservoir mounted on said sleeve, and conduits connecting said reservoir and each hydraulic cylinder at a point posterior to the normal position of the piston.

3. In a recoil absorbing mechanism, a gun, a gun sleeve surrounding a part of said gun, said sleeve having a large cylindrical portion to the rear with respect to the gun and a small concentric cylindrical portion to the front with respect to the gun, a stationary sleeve having large and small diameters corresponding with those of the gun sleeve to form an air buffer, recoil absorbing means mounted on said stationary sleeve, and means connecting the gun and the recoil absorbing means whereby the recoil of the gun is absorbed by said recoil means.

JOHN W. WHITE.